US012745711B2

(12) United States Patent
De Camargo et al.

(10) Patent No.: US 12,745,711 B2
(45) Date of Patent: Sep. 29, 2026

(54) CONVEYOR ROLLER STRUCTURAL ASSEMBLY FOR A HARVESTER

(71) Applicant: CNH Industrial Brasil Ltda., Vale do Sereno (BR)

(72) Inventors: Jean Carlos Pereira De Camargo, Piracicaba (BR); Anderson Antonio Moreno, Piracicaba (BR); Marcelo Dos Santos De Oliveira Silva, Piracicaba (BR); Alessandro Roberto Pereira, Piracicaba (BR)

(73) Assignee: CNH Industrial Brasil Ltda., Nova Lima (BR)

( * ) Notice: Subject to any disclaimer, the term of this patent is extended or adjusted under 35 U.S.C. 154(b) by 370 days.

(21) Appl. No.: 18/537,195

(22) Filed: Dec. 12, 2023

(65) Prior Publication Data

US 2024/0188499 A1 Jun. 13, 2024

(30) Foreign Application Priority Data

Dec. 12, 2022 (BR) ...................... 10 2022 025377 3

(51) Int. Cl.
*A01D 82/02* (2006.01)
*A01D 45/00* (2018.01)
(Continued)

(52) U.S. Cl.
CPC ............. *A01D 82/02* (2013.01); *A01D 57/00* (2013.01); *A01D 57/22* (2013.01); *A01D 45/003* (2013.01); *A01D 45/10* (2013.01)

(58) Field of Classification Search
CPC ...... A01D 57/22; A01D 57/025; A01D 57/00; A01D 45/003; A01D 45/10; A01D 23/06;
(Continued)

(56) References Cited

U.S. PATENT DOCUMENTS 2,234,162 A * 3/1941 Anderson .............. B23Q 7/055 198/782
4,103,769 A * 8/1978 Jorgensen ............ B65G 47/261 198/781.04
(Continued)

FOREIGN PATENT DOCUMENTS

BR 102013027529 A2 * 9/2015
CN 101151955 B * 2/2010
(Continued)

*Primary Examiner* — Christopher J Sebesta
*Assistant Examiner* — Sunny D Webb
(74) *Attorney, Agent, or Firm* — Dority & Manning, P.A.

(57) ABSTRACT

A conveyor roller structural assembly for harvesters, such as those intended for harvesting tall and stalky plants, such as sugarcane and sweet sorghum, with this structural assembly being designed and developed to eliminate material losses through the displacement openings of the floating rollers. The conveyor roller structural assembly is formed by a conveyor roller whose bearings are mounted on support bases, and these support bases are anchored on a pivoting bar which is rotatable about its axis, said structural assembly also comprising at least one closing tab which is mounted in an articulated manner with the support base through a connector element, and it is configured to close a displacement opening provided in the side wall of the chassis of the harvester.

9 Claims, 6 Drawing Sheets

(51) Int. Cl.
*A01D 45/10* (2006.01)
*A01D 57/00* (2006.01)
*A01D 57/22* (2006.01)

(58) Field of Classification Search
CPC ........ A01D 27/04; A01D 45/00; A01D 82/02; A01F 12/10; A01F 7/04
USPC ......... 56/13.3, 504, 122; 198/782, 518, 604, 198/612; 193/35 SS, 35 B
See application file for complete search history.

(56) References Cited

U.S. PATENT DOCUMENTS

| | | | | | |
|---|---|---|---|---|---|
| 5,463,856 | A * | 11/1995 | Beckwith | A01D 45/10 | 460/134 |
| 7,328,786 | B2 * | 2/2008 | Anderson | B65B 59/001 | 198/781.01 |
| 10,517,216 | B2 * | 12/2019 | Bertino | A01F 29/06 | |
| 10,701,864 | B2 * | 7/2020 | Burch | A01D 61/006 | |
| 2015/0331408 | A1 * | 11/2015 | Richard | G05B 19/19 | 700/114 |

FOREIGN PATENT DOCUMENTS

| | | | | |
|---|---|---|---|---|
| CN | 105900601 | A * | 8/2016 | A01D 45/10 |
| CN | 108207305 | A * | 6/2018 | A01D 57/00 |
| CN | 210671339 | U * | 6/2020 | |
| DE | 102017123024 | A1 * | 4/2019 | A01D 43/08 |
| WO | WO-2015159464 | A1 * | 10/2015 | A01D 45/10 |
| WO | WO-2021049476 | A1 * | 3/2021 | A01D 45/10 |
| WO | WO-2022217331 | A1 * | 10/2022 | A01D 75/18 |

* cited by examiner

CONVEYOR ROLLER STRUCTURAL ASSEMBLY FOR A HARVESTER

CROSS-REFERENCE TO RELATED APPLICATIONS

This application is based upon and claims the right of priority to Brazilian patent Application No. 1020220253773, filed on Dec. 12, 2022, the content of which is hereby incorporated by reference herein in its entirety for all purposes.

FIELD OF THE INVENTION

The present invention refers, in general, to a new conveyor roller structural assembly for harvesters, such as those intended for harvesting tall and stalky plants, such as sugarcane and sweet sorghum. More particularly, such a new conveyor roller structural assembly is designed to close the displacement gap of the floating rollers, eliminating the risk of material loss, especially as it manages to follow the surface of the machine chassis.

BACKGROUNDS OF THE INVENTION

According to the state of the art, several models of equipment and agricultural machinery designed and developed to provide increased productivity in the harvest of different types of vegetable crops are known, for example, grain harvesters, forage harvesters, and also harvesters for the so-called tall and stalky plants, such as sugarcane and sweet sorghum.

These machines intended for the harvesting of tall and stalky plants are designed and developed to allow the harvesting of this specific type of crop, since its intrinsic characteristics require proper conditions for its adequate processing, from cutting to transferring to transshipments, buckets, and/or trailers.

In this context, it is known that these machines for harvesting tall and stalky plants comprise a chassis that supports a series of conveyor and chopper rollers responsible for driving and chopping the sugarcane into small stalks, which are transferred to transshipments and/or trailers by an elevator assembly.

Such an elevator assembly is composed of a housing structure, usually metallic, made up of a plurality of individual parts and pieces, this structure being mounted on the rear portion of the machines so that they can be rotated sideways on a support base thereby allowing the positioning of the upper exit end of the elevator assembly in the direction of the transshipment and/or trailer that moves parallel to the harvester when in operation, providing the adequate transfer of the harvested material.

In some machine models, said conveyor rollers are installed in a configuration where part of the rollers is static in relation to the chassis, and part of the rollers are mounted in a floating manner, that is, they move vertically to adapt to the volume of material harvested and processed by the machines. For this purpose, the side walls of the chassis comprise openings, usually in an oblong format, through which the bearings of said rollers move up and down according to the volume of material that passes between the lower and upper rollers.

Depending on the positioning close to the machine chassis, these rollers can be called feed rollers, particularly when they are positioned at the front of the machine and, in a sense, end up being the input of material along the processing path formed by the conveyor rollers assembly.

One of the problems identified by the harvesters equipment manufacturers was related to the risk of part of the harvested material passing through said openings during harvesting work in the field, which was, in a way, solved by the installation of blocking panels close to the roller bearings to thereby prevent the loss of materials through said openings, especially when the rollers are moved upwards.

These state-of-the-art solutions are functional and efficient when applied to conventional harvesters, where the chassis walls are relatively straight and the aforementioned blocking panels need to move only vertically, following the movement of the pivot axis of the roller structural assembly.

However, with the development of new tools and agricultural equipment searching for increased productivity, some models of machines configured to execute the cutting and harvesting of multiple crop rows are known and, in these cases, in some models, the initial portion of the path formed by the rollers comprises two entrances that are unified along the path and, with that, the chassis in this initial portion ends up presenting a triangular configuration, where the external walls are arranged in a sloping way and, consequently, during the vertical displacement of the upper rollers, which are of the floating type, the aforementioned blocking panels of the prior art were not applicable, considering that they could not follow the existing angular variation along the chassis walls generated by the combination of the angled configuration of the wall with the arched configuration of the oblong opening to accommodate the rollers.

More specifically, it was observed that the solutions known in the state of the art to block the displacement openings of the floating rollers could not follow the surface of the chassis in the models of machines whose walls were angled and designed to unify the processing path of harvested materials. This is because the technologies disclosed in the state of the art had panels fixedly anchored close to the pivot axis of the conveyor rollers and, therefore, they are not able to be dynamically adapted during the work of the machine in the field.

In this sense, it is verified that harvesters of the prior art, especially those intended for harvesting sugarcane and sorghum, have some drawbacks and limitations related to the adaptability of the panels that block the opening of the floating rollers along the side walls of the chassis of the harvesters in order to eliminate the risk of losses and improve the productivity of the machines, especially those capable of harvesting multiple crop rows.

Therefore, these are the problems, objectives, and solutions, among others, that are intended to be overcome and accomplished through the development of the present invention.

DESCRIPTION OF THE INVENTION

Consequently, in accordance with the exposed above, the present invention aims to provide a new proposal for a conveyor roller structural assembly for agricultural harvesters, wherein this new conveyor roller structural assembly consists of features designed and developed to obtain a practical, functional, and efficient solution to the drawbacks, problems and limitations identified in the state of the art, as mentioned above.

More particularly, it is one of the objectives of the present invention to provide a new conveyor roller structural assembly for harvesters for harvesting tall and stalky plants, comprising technical and constructive aspects configured to ensure the blocking of the floating rollers opening close to the lateral walls of the chassis and, thereby improving the operating conditions of the machines, but mainly eliminating the risk of material loss during harvesting operations, especially when performed by machines configured to harvest multiple crop rows.

More objectively, and in order to achieve the technical and functional effects summarized above, among others, the present invention refers to a new conveyor roller structural assembly for harvesters, which is formed, basically, of a conveyor roller whose bearings are mounted on support bases, and these support bases are anchored on a pivoting bar that rotates about its axis. The assembly further comprises at least one closing tab which is mounted in an articulated manner to the support base through a connector element and is configured to close a displacement opening provided on the side wall of the chassis of the harvester.

According to possible embodiments of the present invention, said connector element is a hinge and, more particularly, said connector element is formed by a pin mounted on the support base, and on which the connecting tabs of the closing tab are mounted in an articulated manner.

Optionally, according to other possible embodiments of the present invention, said connector element further comprises return elements. More particularly, according to embodiments of the present invention, said return elements are springs, pneumatic, hydraulic, electrical actuators, or a combination thereof.

According to possible embodiments of the present invention, the conveyor roller structural assembly comprises two closing tabs arranged on both bearings of said conveyor roller.

Moreover, according to another embodiment of the present invention, said conveyor roller structural assembly is configured to be applied to a machine chassis whose side walls have a tapering.

Finally, the present invention also relates to a harvester, of the type intended for harvesting tall and stalky plants and comprising a conveyor rollers assembly mounted on its chassis, wherein at least one of said conveyor rollers is mounted through a conveyor roller structural assembly as defined above. Furthermore, according to a particular embodiment of the present invention, said chassis comprises sloping side walls and forms a tapering configuration.

BRIEF DESCRIPTION OF THE DRAWINGS

The characteristics, advantages, and technical effects of the present invention, as indicated above, will be better understood by a person skilled in the art from the detailed description below, made merely for exemplary, and not restrictive purposes, and with reference to the schematic figures attached, wherein.

DESCRIPTION OF THE EMBODIMENTS OF THE INVENTION

Figure 1:
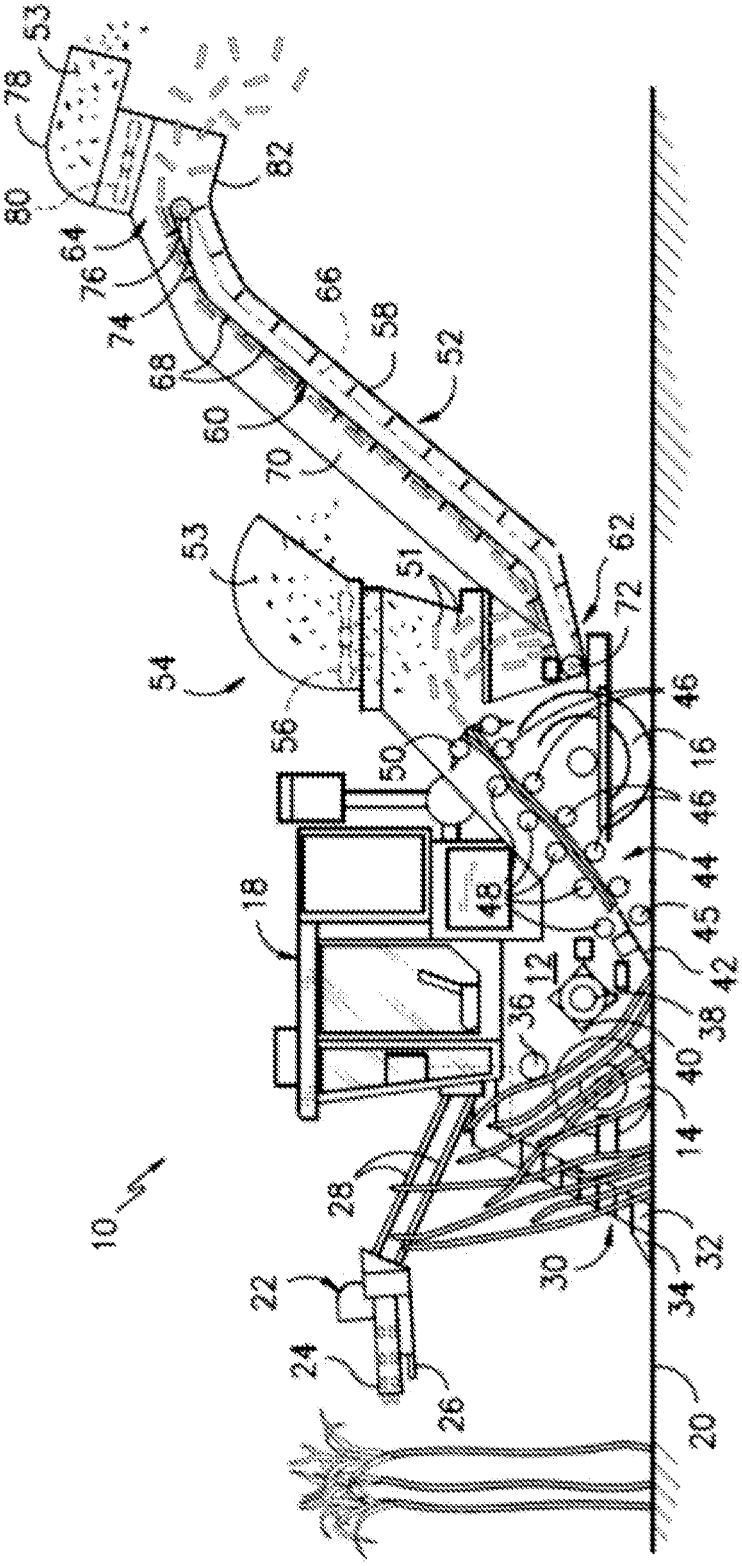
FIG. 1 is a schematic side view of a harvester intended for harvesting tall, stalky vegetable crops such as sugarcane and sweet sorghum.

The invention will now be described with respect to its particular embodiments, with reference to the attached figures. Such figures are schematic, and their dimensions and/or proportions may not correspond to reality, since they only aim to describe the invention in a didactic way. Furthermore, certain known and common construction details may have been omitted for the sake of greater clarity and conciseness of the description that follows. Reference numerals used are repeated throughout the figures to identify identical or similar parts. Terms eventually used such as “above”, “below”, “front”, “behind”, “right”, “left” etc. and its variants must be interpreted according to the orientation given in FIG. 1.

Now referring to the drawings, FIG. 1 illustrates a side view of one embodiment of a harvester 10 according to aspects known in the prior art. The harvester 10 is configured as a sugarcane harvester. However, in other embodiments, the harvester 10 can correspond to any suitable harvester known in the art, such as for sorghum and energy cane.

As shown in FIG. 1, the harvester 10 includes a chassis 12, a pair of front wheels 14, a pair of rear wheels 16, and an operator’s cabin 18. The harvester 10 may also include a primary source of power (e.g., a frame-mounted motor 12) which powers one or both pairs of wheels 14, 16 via a transmission (not shown). Alternatively, the harvester 10 may be a track-driven and therefore may include tracks driven by the drive mechanism in place of the illustrated wheels 14, 16. The drive mechanism may also drive a hydraulic fluid pump (not shown) configured to generate pressurized hydraulic fluid to power various hydraulic components of the harvester 10.

Additionally, the harvester 10 can include various components for cutting, processing, cleaning, and unloading sugarcane as the sugarcane is harvested from an agricultural field 20. For example, the harvester 10 can include a tip cutter assembly 22 positioned on its front end to intercept the sugarcane as the harvester 10 is moved in the forward direction represented by the arrow X. As shown, the tip cutter assembly 22 can include either a binder disk 24 or a cutter disk 26. The binder disk 24 can be configured to bind the sugarcane stalks together so that the cutter disk 26 can be used to cut off the tip of each stalk. Generally, the height of the tip cutter assembly 22 can be adjusted by means of a pair of arms 28 hydraulically raised and lowered, as desired by the operator.

Additionally, the harvester 10 can include a crop divider assembly 30 that extends upward and rearward from the field 20. In general, the crop divider assembly 30 can include spiral feed rollers 32, also known as “lollipop”. Each feed roller 32 may include a soil pads 34, as its lower end assists the crop divider assembly 30 in separating sugarcane stalks for harvesting. Additionally, as shown in FIG. 1, the harvester 10 can include a dropper roller 36 positioned close to the front wheels 14 and a roller with protrusions 38 positioned behind the dropper roller 36. As the dropper roller 36 is rotated, the sugarcane stalks harvested are dropped while the crop divider assembly 30 brings together the stalks from the agricultural field 20 into the harvester 10. Additionally, as shown in FIG. 1, the roller with protrusions 38 can include a plurality of fins 40 intermittently mounted that assist in forcing the sugarcane stalks down. As the roller 38 is rotated during harvesting, the sugarcane stalks that have been dropped by the dropper roller 36 are separated and then drooped by the roller 38 as the harvester 10 continues to be moved forward relative to field 20.

Further referring to FIG. 1, the harvester 10 can also include a base cutter assembly 42 positioned behind the roller 38. As is generally understood, the base cutter assembly 42 can include blades for cutting the sugarcane stalks as the sugarcane is harvested. The blades, located on the periphery of the assembly 42, can be rotated by a hydraulic motor driven, for example, by the hydraulic system of the vehicle. Additionally, in several embodiments, the blades can be angled downwards to cut the base of the sugarcane as the sugarcane is drooped by the roller 38.

Additionally, the harvester 10 may include a set of one or more conveyor rollers 44 located downstream of the base cutter assembly 42 for moving the cut sugarcane stalks from the base cutter assembly 42 along the processing path. As shown in FIG. 1, a lifting roller 45 is arranged between the base cutter assembly 42 and the conveyor rollers assembly 44, wherein such lifting roller is intended to lift the cut sugarcane from the ground 20 and lead it to the conveyor rollers assembly 44 which is formed by a plurality of lower rollers 46 and a plurality of upper rollers 48. As the sugarcane is conveyed by the conveyor rollers assembly 44, debris (e.g., rocks, dirt, and/or similar) can also be transported or dropped through the lower rollers 46 onto the field 20.

Additionally, the harvester 10 may include a chopper assembly 50 located at the downstream end of the conveyor rollers assembly 44 (e.g., adjacent the rearmost upper and lower conveyor rollers 46, 48). In general, the chopper assembly 50 can be used to cut or shred the harvested sugarcane stalks into smaller pieces or "chunks" or fragments 51 that may, for example, measure 15.24 centimeters (six inches), also called small stalks or grinding wheels. The fragments 51 can then be propelled towards an elevator assembly 52 of the harvester 10 to be collected in an external receiver or storage device (not shown).

As is generally understood, pieces of waste 53 (e.g., dust, dirt, leaves, etc.) separated from the sugarcane fragments 51 may be expelled from the harvester 10 through a primary waste extractor assembly 54, which is located behind the chopper assembly 50 and is oriented to direct the waste 53 out of the harvester 10. Additionally, a fan 56 may be mounted on the primary extractor 54 to generate sufficient suction force or vacuum to capture the waste 53 and force the waste 53 through the primary extractor 54. The waste 53 is then directed out and generally in the opposite direction of the harvester 10 through an outlet of the primary extractor 54. The separated fragments 51, heavier than the waste 53 are expelled from the extractor 54, and can then fall to the elevator assembly 52.

As shown in FIG. 1, the elevator assembly 52 may generally include an elevator housing 58 and an elevator 60 that extends within the elevator housing 58 between a lower proximal end 62 and an upper distal end 64. In general, the elevator 60 may include a chain or conveyor belt 66 and a plurality of paddles or cleats 68 coupled or evenly spaced on the chain 66. The cleats 68 may be configured to hold the sugarcane fragments 51 in the elevator 60 as the fragments 51 are lifted towards the top of the elevator 70. Additionally, the elevator 60 may include lower and upper sprockets 72, 74 positioned around the proximal and distal ends 62, 64, respectively. As shown in FIG. 1, an elevator motor 76 can be coupled to one of the sprockets (e.g., top sprocket 74) to drive the chain 66, thereby allowing the chain 66 and cleats 68 to travel in an endless cycle between the proximal and distal ends 62, 64 of the elevator 60.

Furthermore, pieces of waste 53 (e.g., dust, dirt, leaves, etc.) separated from the sugarcane fragments 51 can be expelled from the harvester 10 through a secondary waste extractor assembly 78 attached to the rear end of the elevator 58. As shown in FIG. 1, the secondary extractor assembly 78 may be located adjacent to the distal end 64 of the elevator 60 and may be oriented to direct waste 53 to outside the harvester 10. Additionally, a fan 80 may be mounted in the secondary extractor 78 to generate a sufficient suction force or vacuum to extract the waste 53 and force the waste 53 through the secondary extractor 78. Separated fragments 51, heavier than the waste 53 expelled through the extractor 78, may, then fall from the distal end 64 of the elevator 60. Typically, the fragments 51 may fall through a discharge opening 82 of the elevator assembly 52 into an external storage device (not shown), such as a car, a transshipment, a bucket, etc.

During operation, the harvester 10 is moved across the agricultural field 20 to harvest sugarcane. After adjusting the height of the tip cutter 22 (if used) by means of the arms 28, the binder disk 24 in the tip cutter assembly 22 can be operated to bind the sugarcane tips as the harvester 10 advances across the field 20, while the cutter disc 26 cuts off the leafy ends of the sugarcane stalks to dump them along both sides of the harvester 10. As the stalks enter the row splitter assembly 30, the pads 34 can configure the width of the operation to determine the amount of sugarcane that enters the inlet opening of the harvester 10, whether fixed or adjustable. The lollipops 32 then put together the stems at the entrance to the machine to allow the dropper roller 36 to bend the stems downward together with the action of the winged roller 38. Once the stalks are positioned at an angle as shown in FIG. 1, the base cutting assembly 42 can then cut the base of the stalks of the field 20. The cut stalks are then lifted by the lifting roller 45 and directed to the conveyor rollers assembly 44.

The sugarcane stalks, as cut, are conveyed backward by conveyor rollers 46, 48 which compress the stalks and harvested matter. At the downstream end of the conveyor rollers assembly 44, the chopper assembly 50 cuts or chops the compacted sugarcane stalks into pieces or fragments 51. The conveyed waste 53 (e.g., dust, dirt, leaves, etc.) separated from the sugarcane fragments 51 is then expelled from the primary waste extractor assembly 54 using the suction or vacuum created by the fan 56. The separated/clean fragments 51 then fall into the elevator assembly 52 and travel upward via an elevator 60 from its proximal end 62 to its distal end 64. During normal operation, the elevator assembly 52 is rotated to one side and, once the fragments 51 reach the distal end 64 of the elevator 60, the fragments 51 fall through the discharge opening 82 to an external storage device. Similar to the primary extractor 54, waste is expelled from the harvester 10 through the secondary waste extractor assembly 78 with the aid of the fan 80.

A harvester 10, as described above, can be, for example, a machine known in the state of the art, such as the sugarcane harvesters from CNH Industrial NV sold under the brand name Case IH.

The terms used herein such as, harvester, harvester machine, and their variants are used interchangeably to indicate an agricultural machine intended for harvesting a vegetable crop and, in the case of this description, for harvesting tall and stalky plants, such as sugarcane, energy cane, sorghum, etc.

Figure 2A:
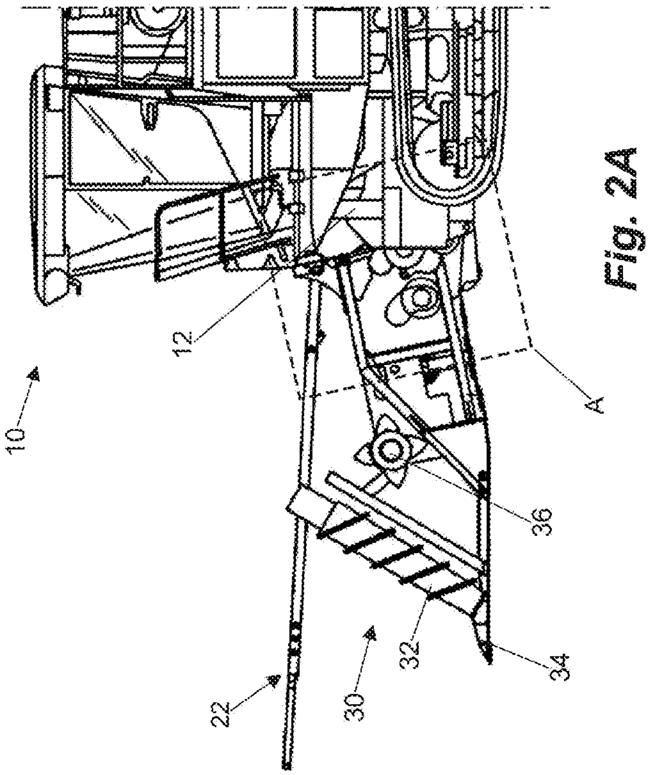
FIG. 2A is a schematic side view of the front portion of a harvester, highlighting the initial portion of the chassis where the conveyor rollers can be arranged, according to the present invention.
Figure 2B:
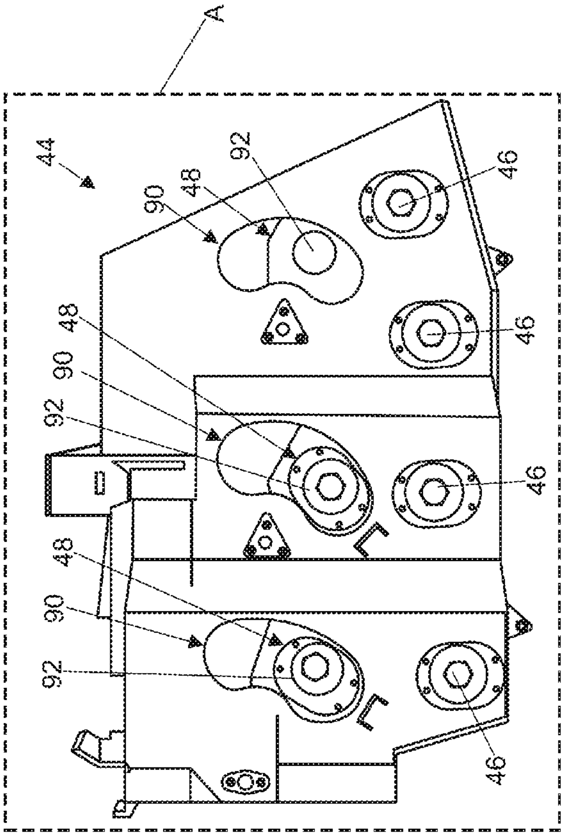
FIG. 2B is a side view of the chassis of a harvester, such as the outlined part A shown in FIG. 2A.
Figure 3:
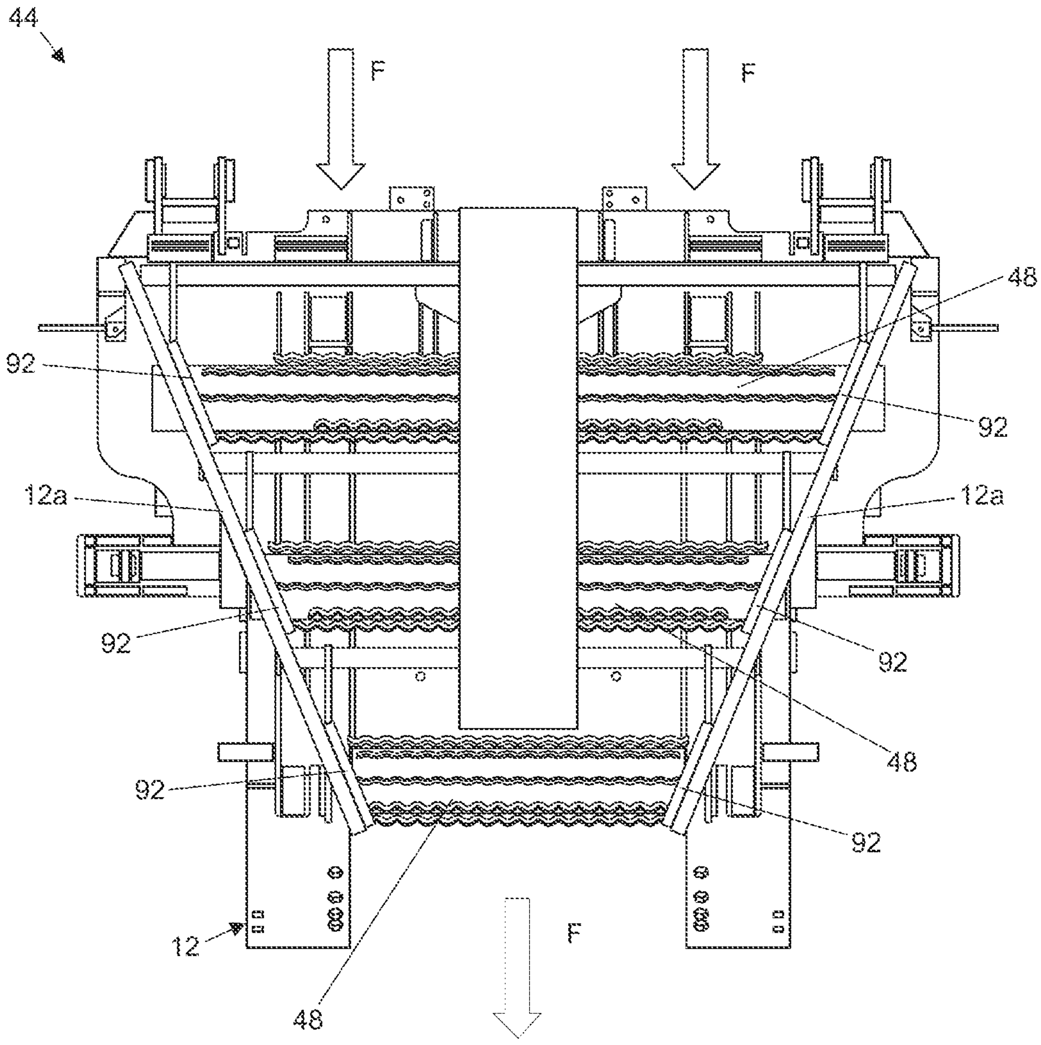
FIG. 3 is a schematic top view of the chassis shown in FIG. 2B, with the conveyor rollers mounted in accordance with the present invention.
Figure 4:
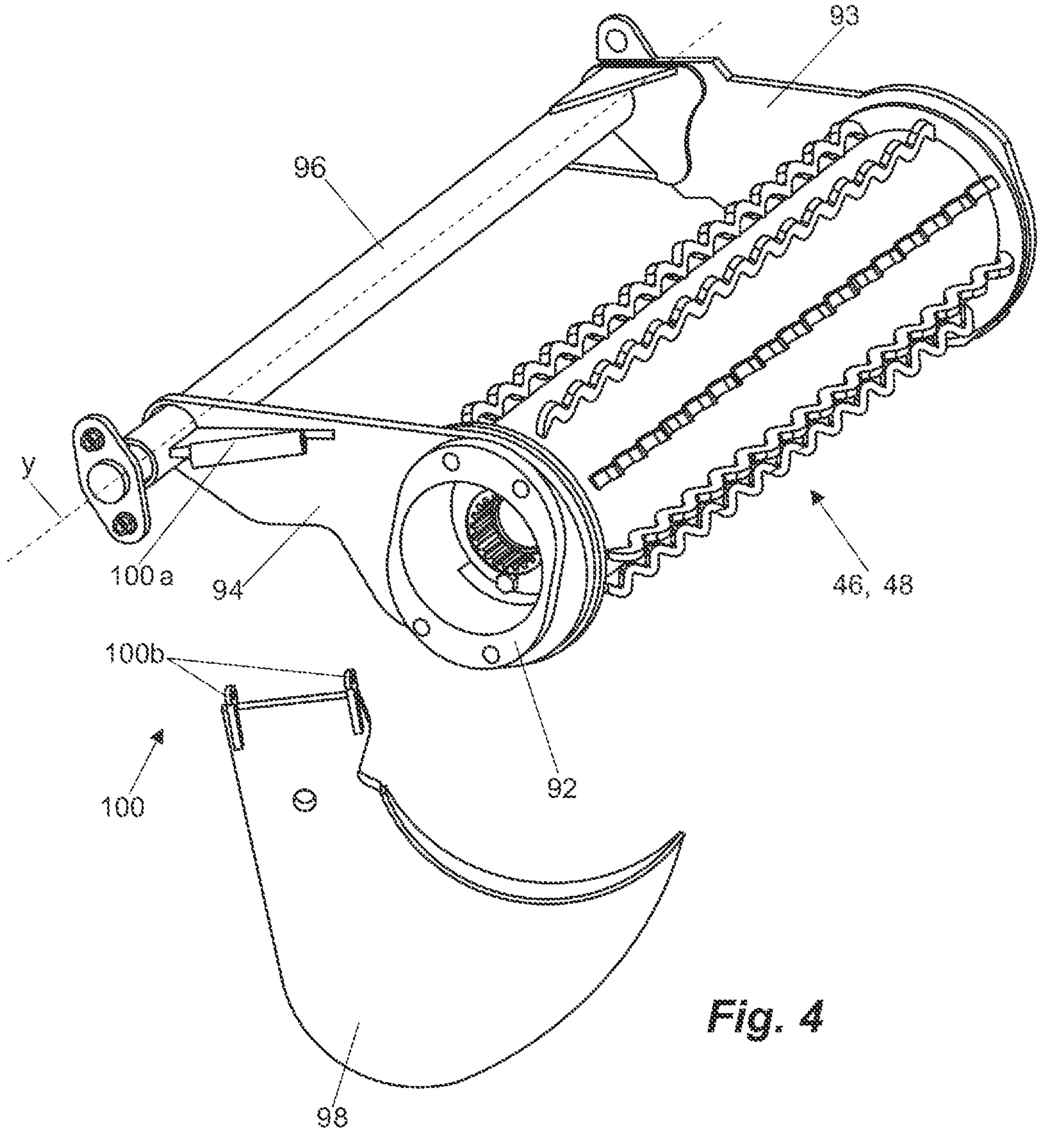
FIG. 4 shows a perspective view of the conveyor roller structural assembly, according to one embodiment of the present invention.

As shown in FIGS. 2A, 2B, and 3, the conveyor roller structural assembly according to the present invention was particularly designed to be used as a floating roller, which is mounted close to the chassis 12 of the harvester 10 in a condition that can be moved vertically according to the amount of material being harvested and processed by the machine. More specifically, as shown in the figures, said conveyor roller, for example, the upper roller 48, is installed in a displacement opening 90 which has an arched configuration and provides movement to the bearings 92 of the conveyor roller 48 to suit the amount of harvested material that enters the conveyor rollers assembly 44.

By way of illustration only, the present specification and the attached figures make reference to the upper conveyor roller 48 of the conveyor rollers assembly 44, however, as should be appreciated by those skilled in the art, the conveyor roller structural assembly according to the present invention could be eventually applied, as a lower conveyor roller 46 and, in this case, adaptations would be adopted by a person skilled in the art to configure the lower conveyor rollers 46 in floating type rollers, that is, capable of being moved vertically.

Particularly with reference to FIG. 3, it is possible to observe that the conveyor roller structural assembly, according to the present invention, was designed and developed particularly to be used in agricultural harvesting equipment and harvesters whose processing path formed by the conveyor rollers assembly 44 comprises a tapering configuration, where multiple crop rows are harvested from the field, forming two processing paths and, subsequently, are grouped into a single path, as represented by the arrows (F) in FIG. 3. In these cases, as can be seen in FIG. 3, the chassis 12 of the machine 10 comprises angled side walls 12*a* on which the lower 46 and upper 48 conveyor rollers are mounted, wherein the conveyor roller configured as a floating roller is mounted in the displacement opening 90 through a structural assembly, according to the object of the present invention.

Now, with reference to the other figures, the conveyor roller structural assembly, according to the present invention, is formed by a conveyor roller 46, 48 whose bearings 92 are mounted on support bases 94 which, in turn, are anchored on a pivoting bar 96 which is rotatable about its axis (y), said structural assembly is configured to be installed close to the chassis 12, so that at least one of said bearings 92 is arranged within a displacement opening 90. Said conveyor roller structural assembly further comprises at least one closing tab 98 which is pivotally mounted through a connector element 100 provided on the supporting base 94 and is configured to close said displacement opening 90.

According to possible embodiments of the present invention, said connector element 100 can be a hinge, such as for example a pin 100*a* mounted on the support base 94, on which connecting tabs 100*b* of the closing tab 98 are mounted in an articulated manner.

In this way, as can be seen, said closing tab 98 is able to follow the angular variation of the angled side walls 12*a*, as the conveyor roller 46, 48 moves along the displacement opening 90 and then, it guarantees that such opening is closed by said closing tab 98, especially when the conveyor roller is working in fully extended position.

Optionally, according to further possible embodiments of the present invention, said connector element 100 may comprise return elements (not shown), such as a spring, a pneumatic, hydraulic, electrical actuator or a combination of these technologies, whose purpose is maintaining said tab closure 98 in contact with, or very close to, the angled side wall 12*a* of the chassis 12 so as not to interfere with the material processing area and, at the same time, prevent losses of harvested material through said displacement openings 90.

Figure 5A:
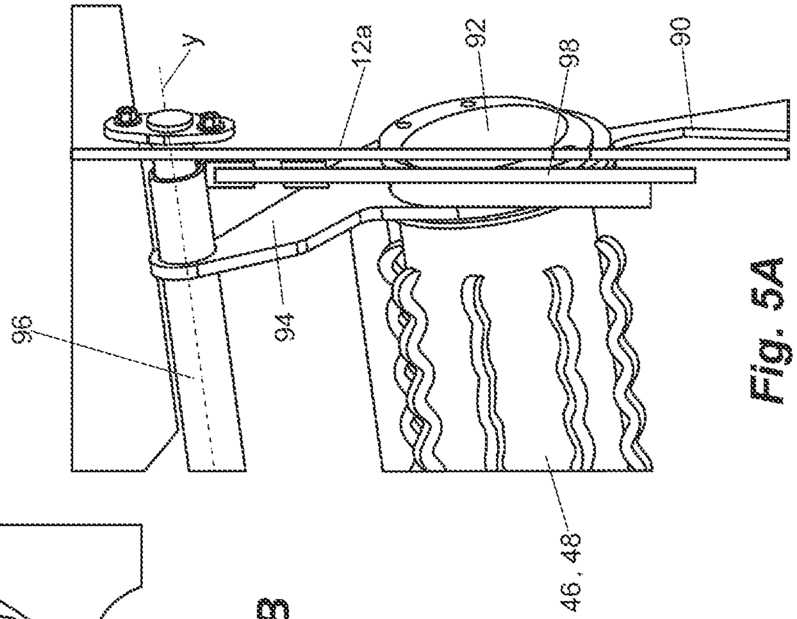
FIG. 5A shows one of the ends of the conveyor roller according to the present invention, in the lower position of the chassis displacement opening, as shown in FIGS. 5B and 5C.
Figure 5B:
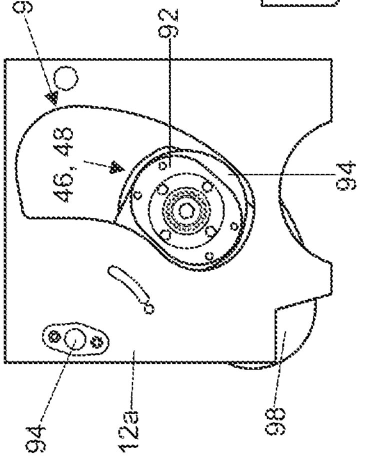
Figure 5C:
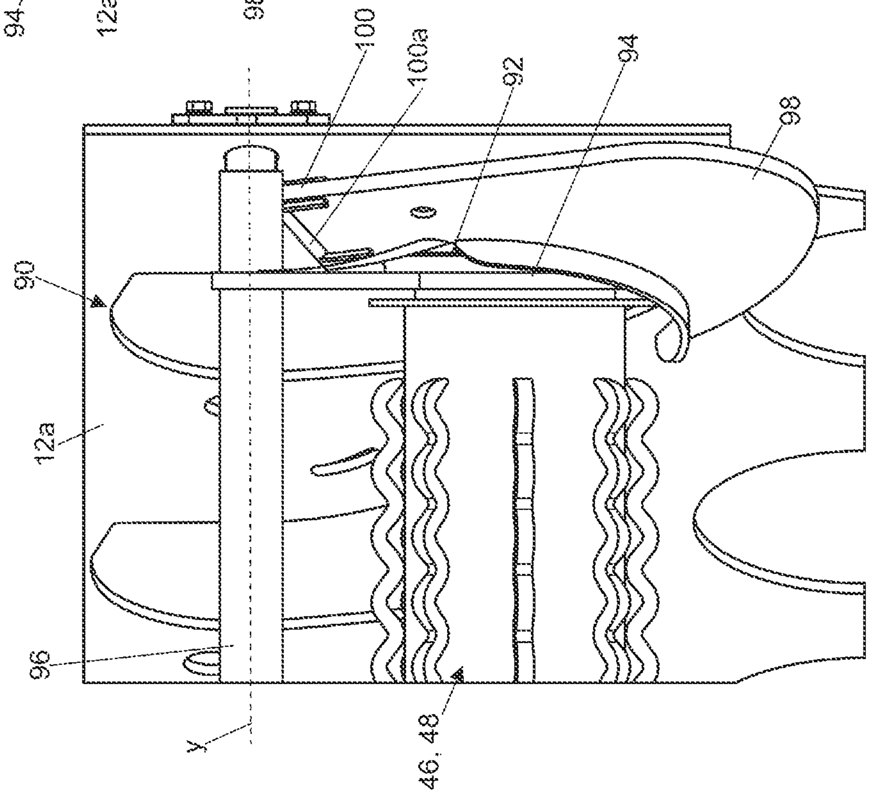

As shown in FIGS. 5A, 5B, and 5C, it is possible to observe that due to the configuration of the angled side walls 12*a* of the chassis 12 of the machine 10, when the conveyor roller 48 is in the lower position, its bearing 92 is relatively aligned with the displacement opening 90. This is because, in this position, the conveyor roller 48 is a little closer to the front face of the chassis 12 and, consequently, the side walls are relatively further away from the center line (c) of the harvester 10.

Figure 6A:
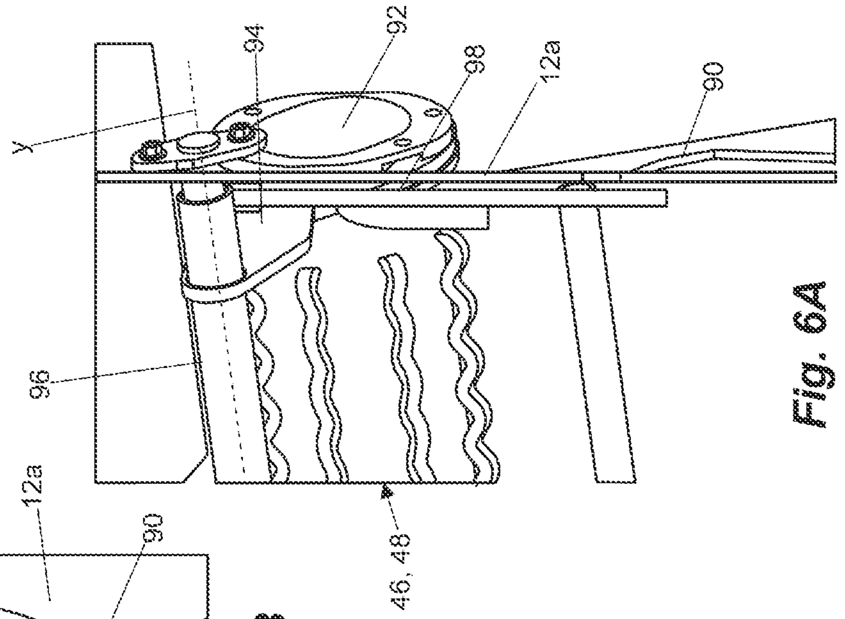
FIG. 6A shows one of the ends of the conveyor roller according to the present invention, in the upper position of the chassis displacement opening, as shown in FIGS. 6B and 6C.
Figure 6B:
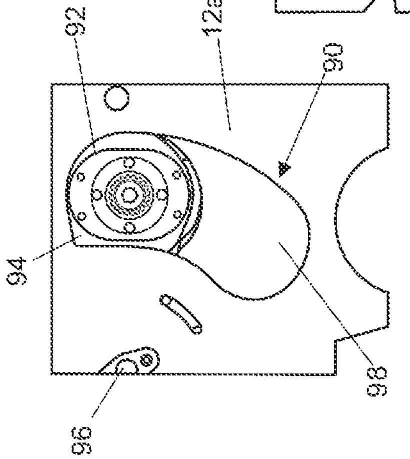
Figure 6C:
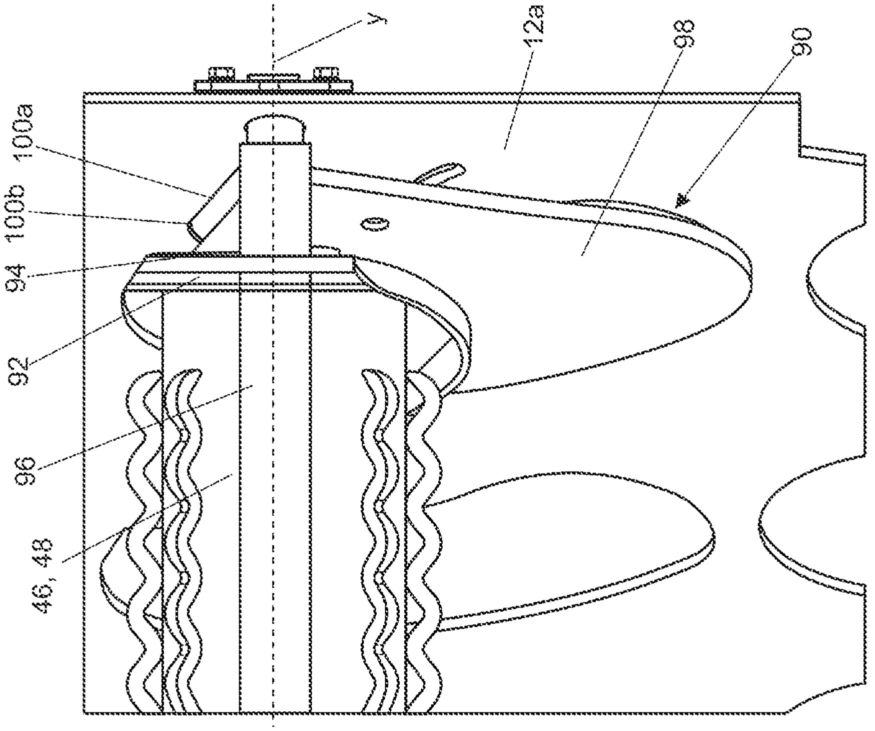

On the other hand, when the conveyor roller 48 is in the most extreme position, as shown in FIGS. 6A, 6B, and 6C, the bearing 92 more perceptibly crosses said displacement opening 90. This is because, in this condition, the conveyor roller 48 is a little further away from the front face of the chassis 12 and, consequently, the side walls are relatively closer to the center line (c) of the harvester 10.

Therefore, due to the technical, constructive, and functional configuration of the conveyor roller structural assembly, according to the present invention, it is possible to guarantee that said closing tab 98 is always parallel to the angled side wall 12*a* of the chassis 12, blocking and preventing materials from passing through the displacement opening 90 during work in the field and, at the same time, without risk of interfering with the flow of the harvested material.

According to possible embodiments of the present invention, said conveyor roller structural assembly comprises two closing tabs 98 arranged on both bearings 92 of the conveyor roller 48. By way of example, it can be observed in the embodiment represented in FIG. 3 that the third conveyor roller 48 is responsible for gathering the harvested material flows, in the case of multiple crop row harvesters and, in this case, both bearings 92 are mounted in displacement openings 90. Obviously, as must be appreciated by those skilled in the art, the conveyor rollers 48 positioned in the front portion of the harvester, such as the first and second conveyor rollers, as the exemplary embodiment represented in FIG. 3, comprise only a closing tab 98 arranged only on the bearing 92 which is mounted close to the angled side wall 12*a* of the chassis 12.

In this way, as should be appreciated by those skilled in the art, in view of the characteristics mentioned above, it is possible to observe that the new solution proposed for the conveyor roller structural assemblies, according to the present invention, prevents the passage and loss of harvested materials through the walls sides 12*a* of the chassis 12, but mainly ensures the integrity of the processing area without the risk of interfering with the flow of material harvested and transported by the rollers assembly, especially in cases where the chassis 12 has a tapering configuration. Therefore, it is possible to state that the solution presented by the present invention avoids losses and also guarantees the productivity and work efficiency of the harvesters 10.

Additionally, the present invention also deals with a harvester 10, such as a machine 10 intended for harvesting tall and stalky plants, which comprises a conveyor rollers assembly 44, wherein at least one of said rollers is mounted according to the conveyor rollers structure assembly as mentioned above.

Finally, considering all of the above, it is important to emphasize that the present specification is only intended to present and define, in an exemplary way, particular embodiments of the new conveyor roller structural assembly for harvesters for harvesting tall and stalky plants 10, according to the embodiment of the present invention. Therefore, as those skilled in the art should appreciate, various modifications and combinations of equivalent elements and details are possible without thereby departing from the scope of protection defined by the attached claims.

The invention claimed is:

1. A conveyor roller structural assembly for a harvester, the conveyor roller structural assembly comprising:

a conveyor roller including a bearing;

a support base rotatably coupled to the conveyer roller via the bearing; and a pivoting bar onto which the support base is anchored, the pivoting bar being pivotable about an axis such that the support base and the conveyor roller pivot with the pivoting bar about the axis;

wherein the conveyor roller structural assembly further comprises at least one closing tab mounted in an articulated manner through a connector element provided on the support base such that the closing tab articulates relative to the support base, and said at least one closing tab is configured to close a displacement opening provided in a side wall of a chassis of the harvester.

2. The conveyor roller structural assembly according to claim 1, wherein said connector element is a hinge.

3. The conveyor roller structural assembly according to claim 1, wherein said connector element is formed by a pin mounted on said support base, and onto which a connecting tab of said closing tab is mounted in an articulated manner.

4. The conveyor roller structural assembly according to claim 1, wherein said connector element further comprises at least one return element.

5. The conveyor roller structural assembly according to claim 4, wherein said at least one return element is at least one of a spring, a pneumatic actuator, a hydraulic actuator, or an electrical actuator.

6. The conveyor roller structural assembly according to claim 1, wherein the at least one closing tab comprises first and second closing tabs arranged along opposed sides of said conveyor roller.

7. The conveyor roller structural assembly according to claim 1, wherein the conveyor roller structural assembly is configured to be applied to a chassis whose side walls are tapered.

8. A harvester of the type for harvesting tall and stalky plants, said harvester comprising a plurality of conveyor rollers mounted on a chassis, wherein at least one of said conveyor rollers is mounted through the conveyor roller structural assembly as defined in claim 1.

9. The harvester according to claim 8, wherein said chassis comprises sloping side walls that form a tapering configuration.

* * * * *